United States Patent [19]
Mees et al.

[11] 3,844,150
[45] Oct. 29, 1974

[54] APPARATUS FOR FORMING COILS USING ROUND CONDUCTOR WIRE

[75] Inventors: Robert D. Mees, Fort Wayne; Albert F. Wilcox, Yoder, both of Ind.; Herman H. Schall, Rome, Ga.

[73] Assignee: General Electric Company, Indianapolis, Ind.

[22] Filed: Dec. 26, 1973

[21] Appl. No.: 427,512

[52] U.S. Cl.......................... 72/206, 242/25, 242/45
[51] Int. Cl.............................................. B21f 3/04
[58] Field of Search..................... 72/206, 250, 249; 140/92.2; 29/605; 242/25, 45

[56] References Cited
UNITED STATES PATENTS
3,648,506   3/1972   Caltagirone........................... 72/206

Primary Examiner—Milton S. Mehr

[57] ABSTRACT

An apparatus for winding at least one coil of flattened electrical conductor wire from round conductor wire, the at least one coil having a number of layers with adjacent layers separated by sheet insulation and with the turns of wire of each layer overlying the turns of the layer below it. The apparatus includes a wire flattening mill for flattening the round conductor wire. The wire mill is driven so as to produce flattened wire at a predetermined wire rate. There is a coil winding machine having an elongated rotatable arbor on which the wire is wound to form the coil and a wire guide reversibly movable longitudinally of the arbor for causing the coils to be formed with layers having predetermined numbers of turns of wire. The drive, or power supply, for rotating the arbor tends to drive the arbor at a wire rate substantially in excess of the wire rate of the wire mill. The arbor drive includes a clutch for controlling the force with which the wire is wound about the arbor and a clutch control for selectively determining the torque delivering capability of the clutch. The clutch control is synchronized with the reversal of the wire guide and is effective to cause the clutch to have a relatively low torque delivery capability as the wire progresses from one layer to the next and to have a higher torque delivery capability as other turns of each layer are wound. The speed of the wire mill may be adjusted to determine the speed with which coils are formed about the arbor, in which case the arbor speed always tends to be substantially in excess of the highest speed of the wire mill.

9 Claims, 5 Drawing Figures

APPARATUS FOR FORMING COILS USING ROUND CONDUCTOR WIRE

BACKGROUND OF THE INVENTION

It has been understood for some time that considerable advantage can be realized in layer wound coils by winding the coils from flattened conductor wire. This situation was discussed in substantial detail and the construction of coils of this type described in U.S. Pat. No. 3,501,728, issued to Richard D. Barriball and assigned to General Electric Company, assignee of the present invention. The particular coil structures illustrated in that patent are particularly useful in ballasts for fluorescent or high intensity discharge lamps. Many of the same advantages are available in layer wound coils for a number of other kinds of windings such as, for instance, a number of different transformer applications. These various types of applications involve the use of wires of many different sizes.

Flattened conductor wire has been available for some time from wire mills. Due to their need for standardization, the particular wire sizes and flattening ratios most readily suited for any particular application may not be readily available at an economic cost. Furthermore, difficulties are experienced in feeding previously flattened wires to multiple coil winding machines as the flattened wire has a great tendency to become twisted and possibly kinked. There also are substantial problems in providing a suitable insulating coating to previously flattened wire.

U.S. Pat. No. 3,648,506, issued to Saverio Caltagirone and assigned to General Electric Company discloses an apparatus for flattening round conductor wire and then winding the flattened wire into one or more layer wound coils. U.S. Pat. No. 3,669,380, also issued to Saverio Caltagirone and assigned to General Electric Company, discloses a reversing wire payoff carriage or wire guide mechanism suitable for use in the apparatus of U.S. Pat. No. 3,648,506. The apparatus and mechanisms of the Caltagirone patents and their overall manner of operation make them very suitable for use in forming coils from relatively small wire sizes. These aforementioned patents are expressly incorporated by reference in the present application.

In the Caltagirone apparatus the wire flattening mill is a major control point in the flattening and winding process. The drive for the wire mill includes a clutch whose torque delivering capability may be varied so that a torque is delivered to the mill which is insufficient to cause the wire to be flattened and fed through the mill. The winding arbor is then operated with a constant torque which applies the additional force to the wire to cause it to be flattened and wound about the arbor. With such an approach it is necessary to have very close synchronization of the flattening mill and the winding arbor. Additionally, the drive train between the wire mill motor and the wire mill is required to absorb the power from the motor which is in excess of that which is desired to be delivered to the wire mill at any particular moment. With small wire sizes this is no great problem. However, in forming coils of flattened wire of larger wire sizes the total torque delivering capability of the wire mill must be very high and thus the motor for the wire mill must be large and powerful. This means that a clutch interposed between the wire mill drive motor and the wire mill must be capable of absorbing a large amount of torque when it is called upon to slip.

Thus, it is desirable to provide an apparatus for winding coils of flattened conductor wire from round conductor wire in which the need of synchronization between the various components of the apparatus is greatly reduced or eliminated and in which the apparatus is not required to absorb large amounts of power.

SUMMARY OF THE INVENTION

Accordingly, it is an object of this invention to provide an improved apparatus for winding coils of flattened conductor wire in which the wire is flattened just prior to being wound into the coils.

It is another object of this invention to provide such an improved flattening and winding apparatus which eliminates the need for close synchronization between the flattening mechanism and the winding mechanism.

Yet another object of this invention is to provide such an improved apparatus which eliminates the requirement that the apparatus absorb large quantities of energy.

In carrying out the objects of this invention, in one form, there is provided an apparatus for winding at least one coil of flattened electrical conductor wire from round conductor wire. The apparatus includes a wire flattening mill for flattening round conductor wire and a first drive means connected to the wire flattening mill for causing the wire flattening mill to produce flattened wire at a predetermined wire rate. The apparatus also includes a coil winding machine having an arbor on which the at least one coil is wound and a second drive means for rotating the arbor. The second drive means tends to drive the arbor at a wire rate substantially in excess of the wire rate of the wire mill. The second drive means also includes a clutch for controlling the force with which the wire is wound about the arbor. There is also a control means for selectively determining the torque delivery capability of the clutch to control the force with which wire is wound into the coil.

The subject matter which is regarded as the present invention is particularly pointed out and distinctly claimed in the concluding portion of the specification. The invention itself, however, together with further objects and advantages thereof, may be best understood by reference to the following description taken in conjunction with accompanying drawings.

DESCRIPTION OF THE PREFERRED EMBODIMENTS

Figure 1:
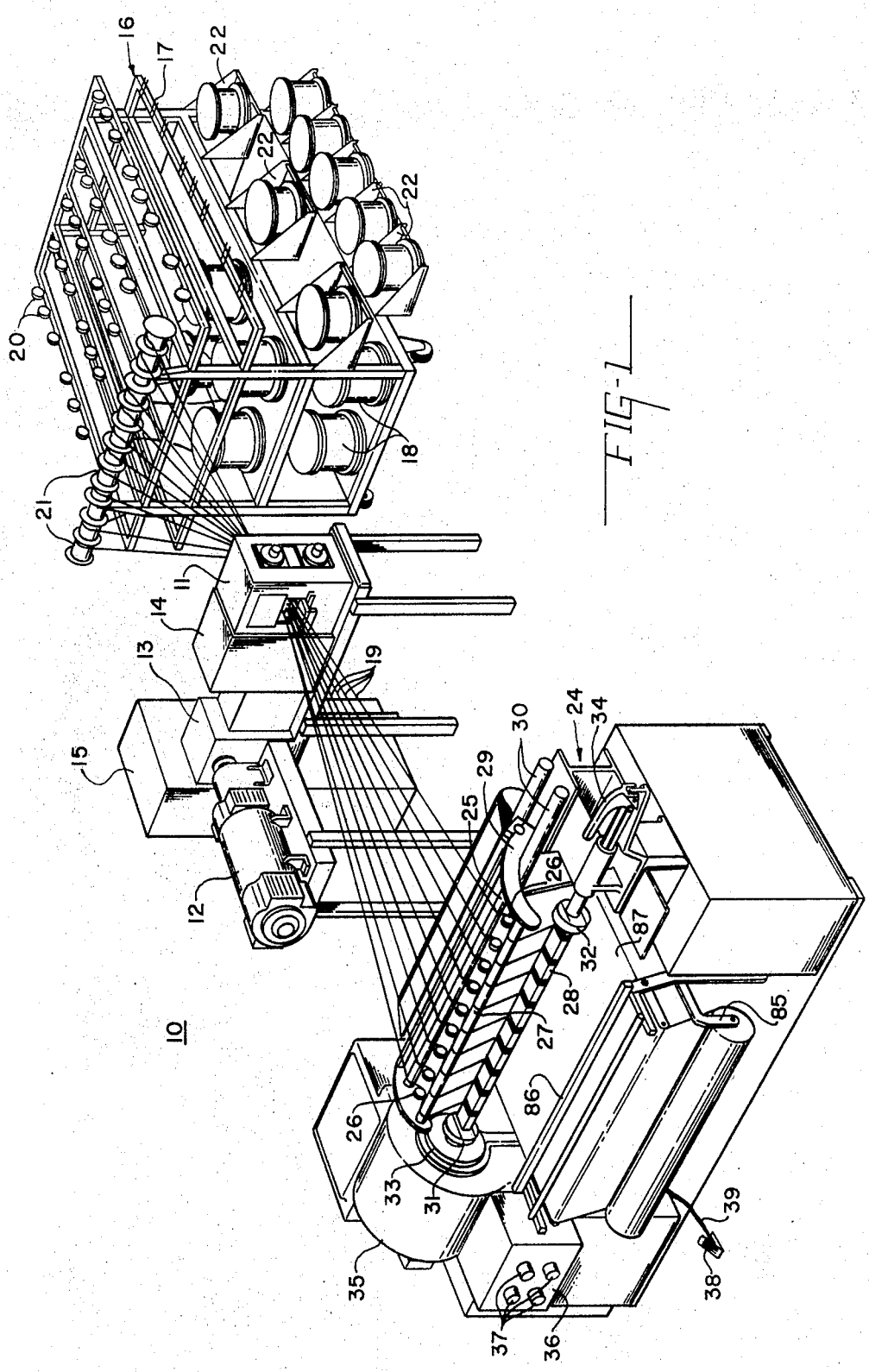
FIG. 1 is a somewhat simplified, schematic perspective view of the apparatus for winding multiple coils of flattened wire in accordance with one form of the present invention.

Referring now to the drawings and particularly to FIG. 1, there is shown, in somewhat schematic and simplified form, an apparatus 10 for flattening round electrical conductor wire into flattened electrical conductor wire and winding the flattened wire into at least one, and in the exemplification, simultaneously into a plurality of coils. In the preferred embodiment the coils are layer wound and will have a sheet of insulating material such as asbestos paper between each pair of layers and each coil. The apparatus includes a wire mill 11 for flattening the round wire to provide it with at least two sides which are flat. The structure of the wire mill itself may take any one of a number of well known configurations and conveniently may be of a structure shown and described in the aforementioned Caltagirone patent, 3,648,506. Power is supplied to the wire mill 11 by a drive motor 12 through a right angle gear reduction unit 13 and a somewhat resilient coupling contained in housing 14. Unlike the wire mill and drive arrangement described in the Caltagirone patent, there is a direct connection from the motor through the gear reduction unit and resilient coupling to the wire mill. That is, there is no clutch or other motion slippage mechanism between the motor and the mill. Moreover, the motor is of a sufficient size that the wire mill will flatten the largest size wires for which it is designed upon energization of the motor and without any additional force being applied to the wires. The speed of the motor may be controlled by an appropriate speed control device such as that generally indicated at 15.

A wire rack generally indicated at 16 is positioned to one side of the wire mill and includes a frame 17 which supports a number of spools of round wire, such as those indicated at 18. Wires 19 from preselected ones of the spools are fed over rollers 20 and rotatable sleeves 21 to the flattening mill. It will be understood that, for ease of operation, the frame 17 should support sufficient wire storage spools or reels to provide the maximum number of wires acceptable by the wire mill at any one time. the frame and rack may be built larger so that, if operation of the mill is to be changed periodically between wires of a first size and wires of the second size, sufficient spools or reels of each size wire may be stored to facilitate the exchange of the wires. Additionally, support trays or bins 22 may be suspended from the sides of the frame to hold spare reels.

From the other side of the flattening mill 11 the various wires 19 extend to a coil winding machine generally indicated at 24. More specifically the wires extend over a first guide roller 25, under spring loaded tensioning wheels 26 and over a second guide roller 27. The wires then extend downwardly and are wrapped about an arbor 28 to form a plurality of layer wound coils of flattened wire. The basic winding machine, excluding the drive arrangement (which will be described in detail hereinafter), may be quite similar to any well known winding machine. The guide rollers 25 and 27 and tensioning wheels 26 from part of a wire guide or wire payoff carriage generally indicated at 29. The wire guide moves longitudinally of the arbor 27 in a reversing manner so that, as the arbor turns, the coils are formed with a number of layers with each of the layers having a number of turns and with the turns in each layer overlying the turns of the preceding layer. To this end, the wire guide may be mounted on guide rods 30. One suitable wire payoff carriage or wire guide which provides substantially instantaneous reversal at the longitudinal ends of the coils is shown and described in the aforementioned U.S. Pat. No. 3,669,380 — Caltagirone.

The arbor 28 is mounted between a driven head stock 31 and a freely rotatable tail stock 32. The head stock also may be manually rotatable by means of the hand wheel 33 when control power is off. Also, the tail stock may be removed from the arbor by means of the handle 34 so that an individual arbor may be removed when the coils on that arbor have been finished and another arbor inserted for formation of additional coils.

The housing generally indicated at 35 encloses various components of the drive for the head stock 31 and thus the arbor. A control panel 36 may be mounted on the front of the machine to support various control knobs or buttons 37 for controlling various functions of the flattening and winding apparatus. Additionally, a foot pedal may be disposed generally as indicated at 38 and connected by cable 39 to the speed control device 15 for controlling the speed of the motor 12.

One basic characteristic of the drive mechanism of the winding machine 24 is that a clutch or other slippage device is provided between the drive motor and the arbor head stock 31. The drive motor tends to rotate the head stock, and thus the arbor, at a speed corresponding to a wire winding rate which is substantially in excess of the wire rate of the flattening mill 11. The clutch or other slippage device provides the rotational force to the arbor with a constant selectable torque delivery capability.

Figure 2:
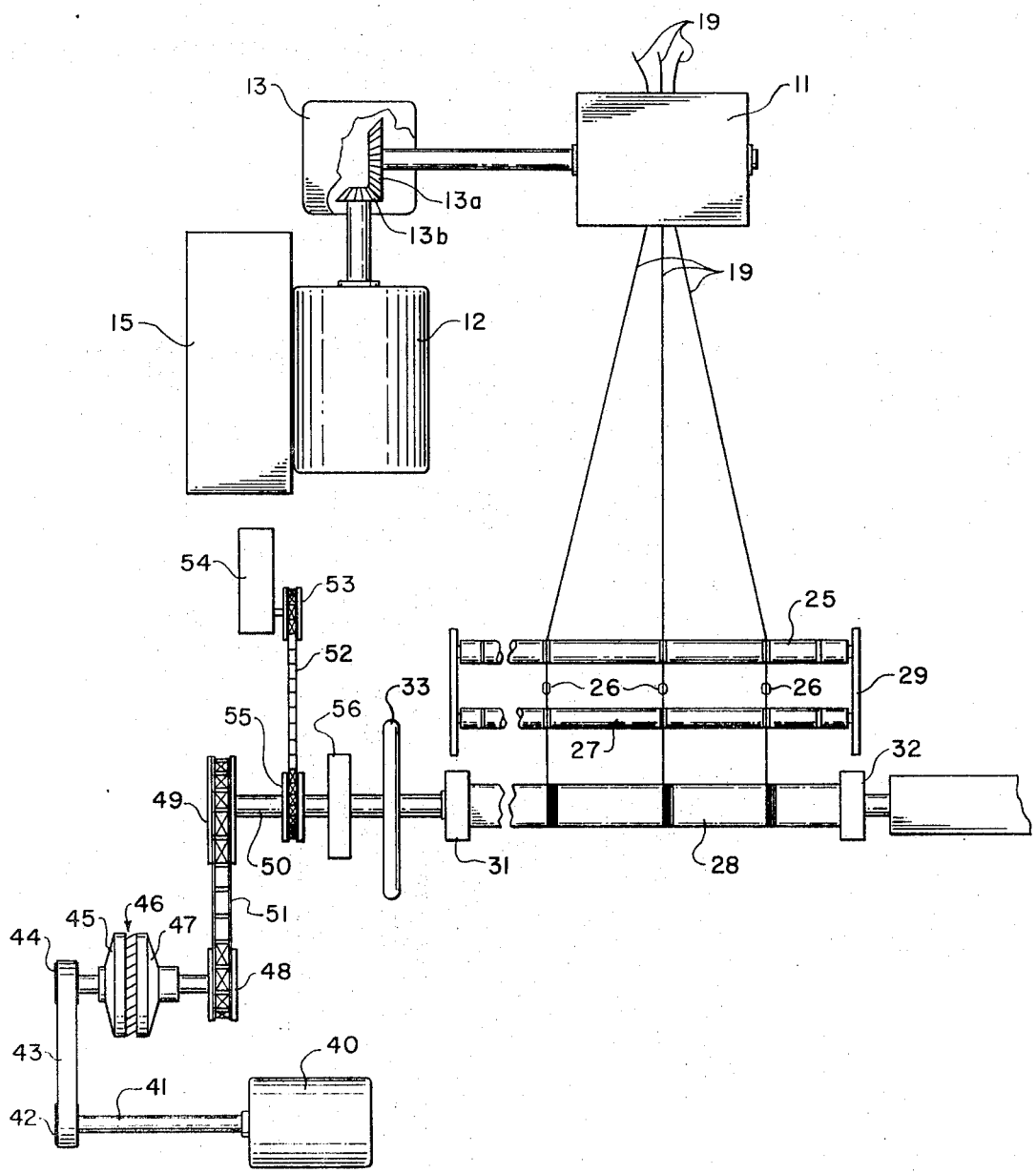
FIG. 2 is a schematic plan view showing the inter-relationship of certain major components of the apparatus of FIG. 1.

Referring now to FIG. 2 there is a somewhat schematic presentation of the basic drive components of the winding apparatus. The wire mill 11 is driven from the motor 12 through the right angle gear reduction unit indicated generally at 13 and represented by intermeshing beveled gears 13a and 13b. Head stock 31 is driven from a drive motor 40 through a drive mechanism which is schematically illustrated by the motor output shaft 41, pulley 42, drive belt 43 and pulley 44 connected to the input 45 of electromagnetic clutch 46. The output 47 of the electromagnetic clutch is connected to a drive sprocket 48. Another drive sprocket 49 is mounted to a shaft 50 that is drivingly connected to the head stock 31. A chain 51 interconnects the drive sprockets 48 and 49.

When motor 40 is energized it attempts to rotate head stock 31 and thus arbor 28 through the electromagnetic clutch 46. Thus, assuming the electromagnetic clutch is energized the head stock 31 will rotate with a speed which is proportional to the speed of motor 40 so long as the resistance to turning the head stock 31 and arbor 28 is not sufficient to overcome the torque transmitting capability of the electromagnetic clutch 46. If this occurs, the input 45 and output 47 of the clutch 46 will slip relative to one another. The motor 40 will continue to rotate while the head stock and arbor stop or remain stationary. With this arrangement, the arbor is driven from the motor 40 which may be of a relatively small size, even for relatively large wires and the clutch 46 will slip unless the motor 12 is driving the wire mill 11.

When the wire mill is flattening wire and the clutch 46 is energized the arbor will be rotated to wind the strands 19 of flattened wire about the arbor to form a plurality of layer wound coils, length and turns of which are determined by the movement of the wire guide 29. The level of energization of clutch 46 determines the tension with which the turns of wire are being wound. The motor 40 and the power train connecting it to the head stock 31 are designed with respect to the motor 12 and power train connecting it to the wire mill 11 such that the motor 40 tends to rotate the arbor 28 at a speed which will give a wire winding rate substantially in excess of the maximum wire flattening rate of the wire mill. Thus the movement of the arbor assures that the wire mill does not overrun the winding machine. This entails substantially constant slippage of the clutch 46. The power required to rotate the arbor, even when relatively large wires are being flattened and wound into coils, is small. Therefore, the amount of power required to be handled by the clutch 46 and thus the power loss and heat generation in the clutch are small. By way of example, in order to wind coils using wires which are .128 inch in diameter the motor 40 may be a one horsepower, alternating current motor. At the same time in order to provide sufficient power to wire mill 11 to flatten the same size wires the motor 12 should be a 25 horsepower d.c. drive motor for instance.

The speed of the drive motor 12 may be controlled in order to control the overall speed of the winding operation independent of the level of energization of clutch 46. In a mechanism of the type illustrated above, using a one horsepower motor to drive the arbor and a 25 horsepower motor 12 to drive the wire mill, the speed of the d.c. motor 12 may be controlled by suitable d.c. drive control such as, for instance, a GP-100 drive control sold by General Electric Company.

In order to provide uniformity between different coils designed for the same end use, it is desirable that the torque of the winding machine, the number of turns in each layer of the coils, the total number of turns, the location of taps, acceleration points et cetera be controlled automatically. A number of these components of the winding operation could be controlled manually. However, in order for an operator to accurately control these various items in a manual manner, the winding speed would have to be extremely slow and complete uniformity still would not be obtained. In order to accomplish the various automatic control operations an output sprocket 55 is mounted on the shaft 50 and is connected by a drive chain 52 to the input sprocket 53 of a tape reader generally indicated at 54. With this arrangement, the movement of the tape reader is directly connected to the rotation of the shaft 50 and thus the rotation of the arbor 28.

In the event the clutch 46 is set to deliver zero or a very minimum torque, the force of spring loaded rollers 26 and the weight of wires 19 could cause the arbor to turn in the reverse direction. This would unwind previously wound wire and adversely effect the synchronization of the apparatus. To prevent this the shaft 50 is provided with a brake 56. The brake 56 may be electrically or pneumatically energized so as to hold the shaft 50 against movement except when winding action is desired. Its energization conveniently may be controlled by the tape reader 54 and foot pedal 38.

Figure 3:
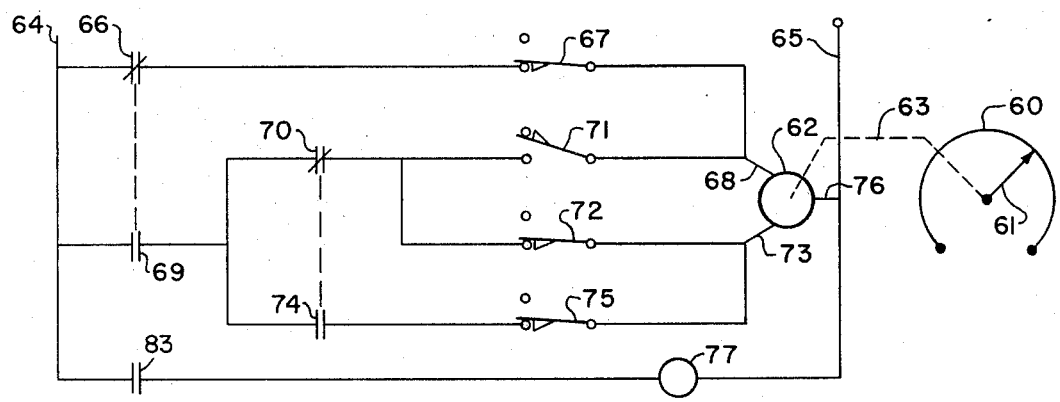
FIG. 3 is a simplified circuit diagram of a torque control circuit for the apparatus of FIG. 1.

With an electromagnetic clutch such as that illustrated at 46 determining the torque delivered to the arbor 28, the torque may be controlled by use of some means which controls the energizing current provided to the clutch. In FIG. 3 there is shown an electrical schematic diagram of a simplified circuit for controlling the torque delivering capability of the clutch 46. A rheostat generally indicated at 60 has its slider 61 mechanically connected to a reversible synchronous motor 62 as indicated by the dash line 63. As the synchronous motor 62 is energized for rotation in different directions the slider 61 will be moved across the winding of the rheostat so as to increase or decrease the rheostat setting. With greater resistance set in the rheostat a lower energizing current will be provided to the clutch 46 and the clutch will have a lower torque delivering capability. With a lower resistance setting in the rheostat a higher energizing current will be provided to the clutch and the clutch will have a greater torque delivering capability.

The control circuit for motor 62 is connected between a pair of power supply lines 64 and 65, which may be connected to a suitable source of electrical energy such as the normal power supply of a factory. From power line 64 a first circuit extends through a first set of contacts 66 and a cam operated switch 67 to a first input lead 68 of the motor 62. A second branch extends from the lead 64 to a second set of contacts 69. From the other side of contacts 69 a sub-branch circuit extends through contacts 70 and cam switch 71 to the motor input lead 68. Another sub-branch circuit extends from contacts 69 through contacts 70 and a cam switch 72 to a second motor input lead 73. Yet another sub-branch circuit extends from the contacts 69 through a set of contacts 74 and a cam switch 75 to the second motor input lead 73. The motor output lead 76 is connected to the power line 65. An additional circuit extends from power line 64 through a set of contacts 83 and a coil 77 to the power line 65.

The motor 62 is constructed so that it will rotate in one direction when electric power is provided between input lead 68 and output lead 76 and will rotate in the other direction when electric power is provided between input lead 73 and output lead 76. Its mechanical connection to the rheostat 60 through the shaft 63 is such that rotation in the first direction causes the rheostat resistance to be increased while rotation in the other direction causes the rheostat resistance to be decreased.

Figure 4:
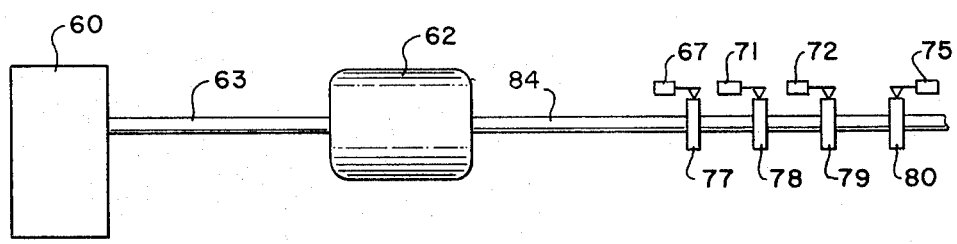
FIG. 4 is a somewhat schematic presentation showing the inter-relationship of certain operating components of the control used in the apparatus of FIG. 1.

FIG. 4 schematically illustrates the mechanical relationship between certain components of the circuit of FIG. 3, and shows that the motor 62 is connected to the rheostat 60 through a shaft 63. The motor 62 also has a back shaft 84 to which are mounted four cams, 77, 78, 79 and 80. The cams 77-80 operate the cam switches, 67, 71, 72 and 75 respectively.

Contacts 66 and 69 conveniently are part of the same switch so that when one set of the contacts are closed the other one is open. In the exemplification of apparatus of FIG. 1 the switch of which contacts 66 and 69 are a part may be incorporated into the foot pedal 38 so that when the operator's foot is completely removed from the pedal contacts 66 are closed and at all other times contacts 69 are closed. The contacts 83 are part of the tape reading mechanism and are momentarily closed when an opening appears in an appropriate channel of the tape being read. Coil 77 is the coil of a reversible ratcheting relay. Each time a relay of this type is energized it will ratchet a short distance. Being a reversible ratcheting relay it is like a flip-flop switch and ratchets in an opposite direction each time it is energized. The contacts 70 and 74 are part of the same relay. Each time the coil 77 is momentarily energized it will open the previously closed set and close the previously opened set of the contacts 70 and 74.

FIG. 3 illustrates the positions the various elements of the control circuit assume at the end of the process of winding one or more coils about the arbor. It will be seen from the configuration of the elements in FIG. 3 that, at the end of the winding of the last coil, the motor 62 was energized through contacts 66 and cam switch 67, in a direction to increase the rheostat resistance to its maximum setting. This reduced the torque delivery capability of clutch 46 to a minimum amount. This minimum torque delivery capability is designed so as to be insufficient to enable the arbor 28 to be turned by the motor 40. And as explained previously, this was done after the operator's foot had been removed from the foot pedal 38 so that the wire flattening mill was not delivering wire and the brake 56 was holding shaft 50. The entire apparatus could have then been turned off by operation of one of the switches 37. In the event the reduction of torque to its minimum was in conjunction with the end of the winding of one set of coils upon which another set of coils were to be wound the apparatus could be left running. No wire would be wound as the torque delivery capability of the clutch is insufficient and the wire mill is inoperative.

When the operator desires to wind the next set of coils, whether it be a first set directly over the arbor or a set of coils being wound concentrically over a previously wound set of coils, the foot pedal 38 is depressed. This causes spindle brake 56 to release shaft 50. This also immediately causes contacts 66 to open and contacts 69 to close. A circuit is initially established from power line 64 through contacts 69, contacts 70 and cam switch 72 to input lead 73 of the motor 62. The motor is energized to reduce the resistance of the rheostat and thus increase the torque capability of the clutch. As the arbor begins to turn the torque begins at a minimum and increases so that for the very first few turns, for instance two turns by way of example, the wire is wound with a very minimum of torque. This provides a few turns which may be easily removed from each of the windings to provide taps.

Cam 79 then opens switch 72. Essentially contemporaneously an opening in the appropriate channel of the tape in the tape reader causes it to momentarily close contacts 83. This energizes coil 77 of the ratcheting relay. This causes contacts 70 to open and contacts 74 to close. Thus, energization of motor 62 in a direction to increase the torque capability of clutch 46 is continued and the rheostat quickly reaches its minimum resistance setting and the clutch 46 reaches its corresponding maximum torque transmitting capability. Then cam 78 closes cam switch 71 and cam 80 then opens switch 75. The motor 62 is de-energized because closed cam switch 71 is in series with open contacts 70 and closed contacts 74 are in series with open cam switch 75. At this time cam 79 has opened switch 72. The arbor is then rotated and the carriage 29 is moved longitudinally of the arbor to wind a number of turns in a side-by-side manner to form a layer for each of the coils being wound.

As the wire guide, or carriage, 29 approaches the end of the layer another hole in the proper channel of the tape causes the tape reader to momentarily close contacts 83. This results in coil 77 again reversing the condition of the contacts 70 and 74 so that contacts 70 are closed and 74 are open. Motor 62 then is energized from power line 64 through contacts 69, contacts 70 and switch 71 to the input lead 68. The motor 62 causes the rheostat resistance setting to quickly rise to an intermediate level and the torque delivery capability of clutch 46 is quickly reduced to an intermediate level.

As the winding action of the arbor reaches the end of the desired number of turns in the layer, an opening in another channel of the tape causes the tape reader to stop the wire mill. The torque delivery capabilities of the clutch cannot pull wire through the wire mill without the wire mill operating and therefore the arbor stops and the clutch 46 slips. The operator then inserts a sheet of insulating material, such as asbestos paper, onto the just wound layer and then momentarily releases and represses the foot pedal 38 causing the wire mill to begin again. When the motor 62 reached the intermediate torque level, cam switch 75 was closed and cam switch 71 was open. As the wire flattening mill begins operation an opening in the appropriate channel in the tape causes contacts 83 to be momentarily closed to energize coil 77. This reverses contacts 70 and 74 so that contacts 70 are open and contacts 74 are closed. Thus the motor 62 reverses the setting of the rheostat 60 and quickly brings it to its position in which the torque delivery capability of clutch 46 is at its maximum. This action, however, takes a turn or two on the coil. During this time the carriage or wire guide reverses and brings the wire back so that it rides up over the previously wound layer and insulation and positions the wire over the last wound turn.

The torque with which the wire rise is laid is sufficiently low so as not to harm the insulation. However, the vast majority of the turns of the subsequently wound layer are wound at the high torque delivery capability of the clutch. This alternate increasing and decreasing of the torque is repeated as the end of each layer of the coil is reached and the wire guide reverses to bring the wire back and lay a subsequent layer in the opposite direction. When the coil is finished and the operator's foot is removed from the pedal 38 the contacts 66 and switch 67 are closed and the motor 62 is energized to increase the resistance of the rheostat 60 to its maximum so that the torque delivering capability of the clutch 46 will be at its minimum. This causes the coil to be finished with a few turns of minimum tension wire and the next coil to be begun with a few turns of minimum tension wire to provide taps.

From the foregoing brief description of the apparatus, it will be understood that normally the operator will insert a sheet of insulation, such as asbestos paper, between each adjacent pair of layers in each coil and between adjacent, concentric coils. In order for the operator to have a readily available supply of paper the winding machine 24 may be provided with a pair of hangers, one of which is indicated at 85, which support a roll of the appropriate insulation, and a guide and securing mechanism 86 placed over a table or suface portion 87 of the winding machine. With this arrangement a suitable length of the paper can be pulled off of the roll, accurately measured and cut while one layer of the coil is being wound to be ready for placement between it and the next layer.

From the foregoing description it will be understood that the exemplification apparatus greatly reduces the amount of synchronization needed between the wire flattening mill and the winding apparatus. At the same time it reduces the energy absorbing requirements of the clutch without any danger of the wire mill overrunning the winding apparatus. While the invention is useful in winding coils from all sizes of wire it is very desirable for use with larger sizes of wire such as those used in power transformers. In such applications the wire flattening mill requires great torque while the winding operation requires only a relatively low torque.

Figure 5:
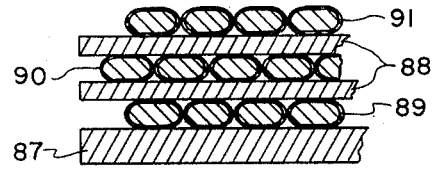
FIG. 5 is a fragmentary cross-section of a typical coil which may be wound using the apparatus of FIGS. 1–4.

Referring now to FIG. 5, there is illustrated part of a typical coil which may be wound using the apparatus of the present invention. The coil is wound upon a heavy layer or bobbin 87 of insulation. Additional somewhat thinner sheets 88 of insulation are placed between the layers of wire. It will be noticed that each layer 89, 90, and 91 of the coil is comprised of a number of turns of insulated wire and that each layer is offset from the adjacent layers a distance equal to substantially one-half the width of the wire. The left end of FIG. 5 illustrates one axial end of the coil. It will be noted that the insulation 87, 88 extends axially beyond the layers of the windings.

Power transformers are often called upon to operate at relatively high temperatures. The wire insulation should, in addition to good electrical properties, be resistant to such high temperatures. For such applications the conductor should have such properties and not be affected by the flattening and winding process. A suitable conductor includes an insulation which is a lightly crosslinked linear polymer, of high molecular weight, such as fully or partially aromatic polyamides, polyimides or polyamide-imides, that display the ability to elongate under high load and are characterized by toughness and a high degree of film continuity at temperatures up to 250°C.

While in accordance with the patent statutes there has been described what at present is considered to be the preferred embodiments of this invention, it will be obvious to those skilled in the art that various changes and modifications may be made therein without departing from the invention. It is therefore intended in the appended claims to cover all such changes and modifications as fall within the true spirit and scope of our invention.

What we claim as new and desire to secure by Letters Patent of the United States is:

1. Apparatus for winding at least one coil of flattened electrical conductor wire from round conductor wire, comprising:
   a. a wire flattening mill for flattening round conductor wire;
   b. first drive means connected to said wire mill for causing said wire mill to produce flattened wire at a predetermined wire rate;
   c. a coil winding machine including an arbor on which the at least one coil is wound; and
   d. second drive means for rotating said arbor, said second drive means tending to drive said arbor at a wire rate substantially in excess of the wire rate of said wire mill; said second drive means including a clutch for controlling the force with which the wire is wound about said arbor.

2. Apparatus as set forth in claim 1, further including: control means for selectively determining the torque delivery capability of said clutch.

3. Apparatus as set forth in claim 2, wherein: said control means is effective to cause said clutch to have a first torque delivery capability insufficient to cause wire to be wound about said arbor and at least a second higher torque delivery capability for causing wire to be wound about said arbor.

4. Apparatus as set forth in claim 2, wherein: said clutch is of the electromagnetic type and said control means is effective to determine the electrical energization of said clutch.

5. Apparatus as set forth in claim 1, wherein: said first drive means is capable of driving said wire mill at a plurality of selected wire rates, said second drive means tending to rotate said arbor at a wire rate substantially in excess of the highest wire rate of said wire mill.

6. Apparatus for winding at least one coil of flattened electrical conductor wire from round conductor wire, the at least one coil having a plurality of layers with adjacent layers separated by sheet insulation; said apparatus including:
   a. A wire flattening mill for flattening round conductor wire;
   b. first drive means connected to said wire mill for causing said wire mill to produce flattened wire at a predetermined wire rate;
   c. a coil winding machine, including an elongated rotatable arbor on which the at least one coil is wound and a wire guide reversibly moveable longitudinally of said arbor so that said at least one coil is formed of layers of predetermined turns of wire;
   d. second drive means for rotating said arbor, said second drive means tending to drive said arbor at a wire rate substantially in excess of the wire rate of said wire mill; said second drive means including a clutch for controlling the force with which the wire is wound about said arbor;
   e. said second drive means further including control means for selectively determining the torque delivering capability of said clutch; said control means being synchronized with the reversal of said wire guide and effective to cause said clutch to have a relatively low torque delivering capability as the wire progresses from one layer to the next and to have a higher torque delivering capability as other turns of each layer are wound.

7. Apparatus as set forth in claim 2, wherein: said clutch is of the electromagnetic type and said control means is effective to determine the electrical energization of said clutch.

8. Apparatus as set forth in claim 6 wherein: said first drive means is capable of driving said wire mill at a plurality of selected wire rates, said second drive means tending to rotate said arbor at a wire rate substantially in excess of the highest wire rate of said wire mill.

9. Apparatus as set forth in claim 8, further including means for selecting the wire delivery rate of said wire mill whereby the speed at which coils are wound is controlled independent of the torque delivering capability of said clutch.

* * * * *